United States Patent [19]

Liermann et al.

[11] 4,118,121
[45] Oct. 3, 1978

[54] CONTINUOUS MICROFILM CAMERA

[75] Inventors: Traugott Liermann, Unterhaching; Karl-Heinz Dietrich, Munich, both of Fed. Rep. of Germany

[73] Assignee: AGFA-Gevaert AG, Leverkusen, Fed. Rep. of Germany

[21] Appl. No.: 817,729

[22] Filed: Jul. 21, 1977

[30] Foreign Application Priority Data

Jun. 21, 1976 [DE] Fed. Rep. of Germany ....... 2632791

[51] Int. Cl.² ............................................. G03B 27/62
[52] U.S. Cl. ..................................................... 355/75
[58] Field of Search ...................... 355/75, 76, 23, 24, 355/30, 64, 50, 72, 74, 18

[56] References Cited

U.S. PATENT DOCUMENTS

| 3,051,039 | 8/1962 | Wight | 355/72 |
| 3,103,850 | 9/1963 | Khoury et al. | 355/76 |
| 3,547,536 | 12/1970 | Phleps et al. | 355/50 |

FOREIGN PATENT DOCUMENTS

| 267,906 | 1/1969 | Austria | 355/75 |
| 1,214,798 | 11/1959 | France | 355/76 |
| 707,291 | 6/1941 | Fed. Rep. of Germany | 355/18 |

Primary Examiner—Donald A. Griffin

[57] ABSTRACT

A continuous microfilm camera transporting original sheets to a picture-taking area. Two parallel opposite guide plates within the picture-taking area from a transit slit of variable width for the original sheets. At least one of the plates is movable relative to the other plate and at least one of the plates is transparent. A magnetic attracting strip is attached to at least one of the plates and provides an attractive force bringing the plates together for straightening the original sheet.

8 Claims, 3 Drawing Figures

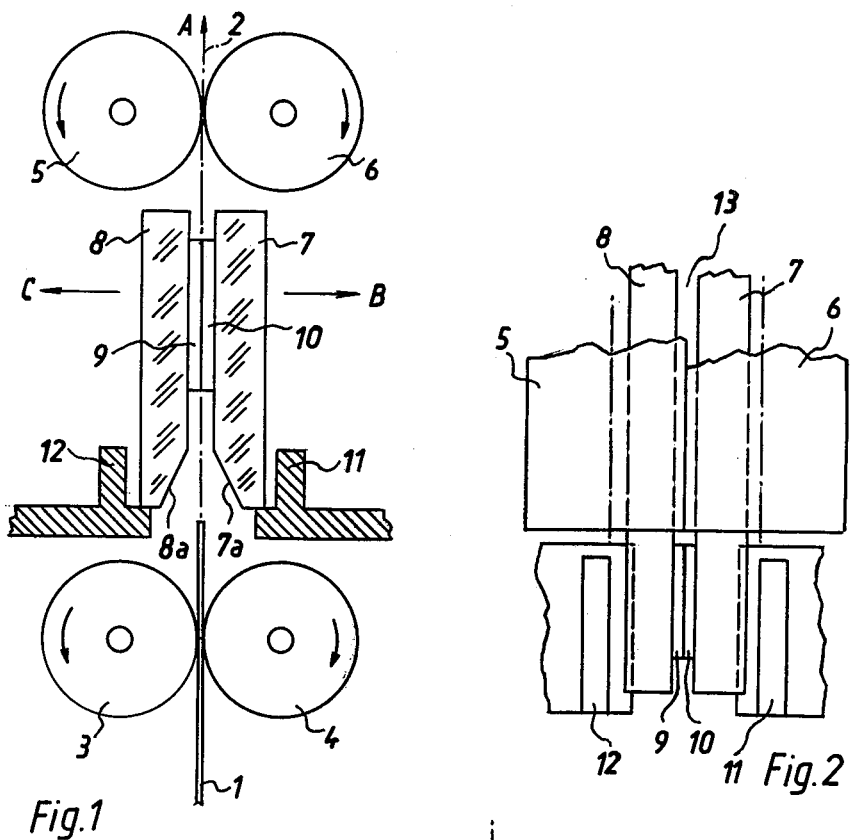
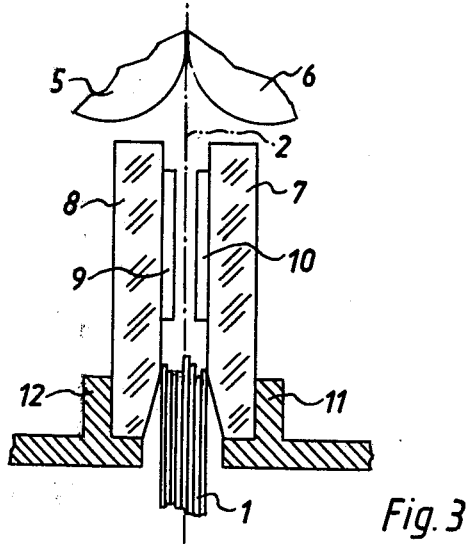
Fig.1
Fig.2
Fig.3

CONTINUOUS MICROFILM CAMERA

BACKGROUND OF THE INVENTION

The invention relates to a continuous microfilm camera for transporting original sheets to a picture-taking area and placing same in position.

Microfilm cameras are known which have a transport path for original sheets passing a picture-taking area. In the area of the taking of the picture, the original sheets are placed between two guide plates providing a transit slit of variable width and being held together by spring forces. At least one of the plates is transparent and at least one of the plates is movable.

Such guiding plates are necessary for transporting mechanically unstable sheets such as onion skin, thin airmail paper, foils, etc., safely into the picture-taking plane. In case several originals are transported simultaneously through the apparatus and in order to avoid sheet accumulation at the entrance of the very narrow transit slit, a prior art apparatus is provided with guide plates held together with springs attached to the plates and movably mounted for motion relative to each other. It is the purpose of this arrangement to provide for the simultaneous transit of several sheets by pressing apart the guide plates and to permit an orderly transit through the apparatus. A disadvantage of this arrangement is the increase in spring force with increasing distance of the guiding plates. The increase in the spring force as the slit width increases leads to such a large pressure of the guide plates on the passing original sheets that it tends to cause a jamming of the sheets.

SUMMARY OF THE INVENTION

It is an object of the invention to provide a continuous-flow microfilm camera for reliably transporting and positioning original sheets for picture taking.

It is another object of the invention to prevent, with simple means, an accumulation or jamming of original sheets in the area of the guiding plates.

These and other objects and advantages of the present invention will become evident from the description which follows.

BRIEF DESCRIPTION OF THE INVENTION

A continuous microfilm camera is provided having a transport path for passing original sheets through a picture-taking area with two guide plates forming a transit slit of variable width for the original sheets. At least one of the plates is movable and at least one of the plates is transparent. At least one of the plates has a magnetic attraction part for providing an attractive force which decreases in strength as the distance between the plates increases and acts between the plates. The magnetic attraction can be provided by a strip of magnetic material mounted on one of the plates. Furthermore, the magnetic attraction can be provided by at least two magnetic strips attracting each other and mounted on the two sides of the two plates facing each other. Preferably the magnetic strips are mounted on the edges of the guide plates located outside of the flow path of the original sheets. Simultaneously the magnetic strips can act as a stop for setting a minimum distance between the plates. For easier introduction of the oncoming original sheets, the entrance edges of the guide plates can be bevelled. A stop may be provided for limiting the maximum distance between the guide plates in the apparatus. The stop is preferably placed in such a position, depending on the size of the magnetic attraction between the plates, as to bring the plates back to their minimum distance upon removal of externally-introduced forces widening the plate distance.

The invention accordingly consists in the features of construction, combination of elements, and arrangement of parts which will be exemplified in the device hereinafter described and of which the scope of application will be indicated in the appended claims.

BRIEF DESCRIPTION OF THE DRAWING

In the accompanying drawing in which there is shown one of the various possible embodiments of the invention:

FIG. 1 is a sectional view of the guide plates in minimum distance position;

FIG. 2 is a projectional view from above of the arrangement of FIG. 1; and

FIG. 3 is a sectional view of the arrangement of FIG. 1 with the guide plates in maximum distance.

DETAILED DESCRIPTION

Referring now to FIG. 1, an original sheet 1 in a transport path 2 is moved by transporting rollers 3, 4, 5, and 6 in the direction of arrow A through a picture-taking area. During the transit of the original sheet through a slit 13 formed by two transparent guide plates 7, 8, the front and the back of the original sheet are microfilmed with optic arrangements not shown in the drawing. At least one of the guide plates for placing original sheets in a picture-taking position is equipped with a magnetic element acting in the direction of the other plate. While spring forces generally increase with increasing distance of guide plates to be held together, magnetic forces decrease with increasing distance. In case several original sheets enter simultaneously, the guide plates are pressed apart and their pressure against the sheets gets smaller resulting in essentially unimpeded passage of the sheets through the guide plates. Preferably, at least two mutually-attractive magnetic strips are attached to the inside of the guide plates at their edges outside of the path of the original sheets to be transported through. Preferably these magnetic strips form a stop for defining a minimum width between the guide plates. The two entrance edges of the guide plates are bevelled for easier separation of the guide plates through a wedge effect and for safe introduction of the original sheets into the transit slit. Each of the guide plates has associated an outer stop which limits the maximum width of the slit. The maximum width is determined by having the magnetic force sufficiently strong to bring the plates back after elimination of external forces all together. The force holding the plates together is thus the lowest possible for returning the plates back to minimum position and therefor provides optimal safety against sheet accumulation in front of the guide plates.

The transparent guide plates ensure that the original sheet is in the desired plate during the time of microfilming. The bevelled edges 7a and 8a guarantee that the original sheets entering the picture-taking area move safely in the transit slit.

Outside of the path 2 of the original sheets and at the inside of the guide plates 7 and 8 there are attached positioning elements 9, 10. Positioning element 10 is a magnetic strip and element 9 is an iron strip. The elements 9, 10 mutually attract each other and bring the guide plates together until the two elements 9, 10 touch each other. The width of the transit slit 13 is determined by the thickness of strips 9, 10.

In case of an unintentional operation or a malfunction of the sheet feed mechanism whereby several sheets are introduced simultaneously into the transit path, or in case the original sheets have attached extraneous materials like staples, paper clips, etc., then the transit slit 13 would be too narrow for passage with the guide plates 7, 8 lying at minimum distance. This would result in an accumulation of sheets at the entrance of the slit. Therefore, the two guide plates 7, 8 are movable in the direction of the arrows B and C, respectively. Several sheets entering simultaneously into the transit slit press apart by wedge action the guide plates 7, 8 against the force of the magnetic elements 9, 10 and a broader transit slit results. The attraction forces acting between the guide plates decrease with increasing slit width resulting in relatively small frictional forces opposing the transporting of the original sheets and in a guiding for the sheets adapted to their momentary thickness.

The position of the guide plates as shown in FIG. 3 represents the largest possible slit width for the apparatus, and the stops 11, 12 prevent the plates from moving further apart. This largest slit width is tuned to the magnetic elements for providing a magnetic force sufficient to bring the plates together after sheets of appreciable thickness have run through.

It thus will be seen that a device has been provided which achieves the various objects of the invention and which is well adapted to meet the conditions of practical use. As various possible embodiments might be made of the above invention, and as various changes might be made in the embodiment set forth above, it is to be understood that all matter herein described or shown in the accompanying drawing is to be interpreted as illustrative and not in a limiting sense.

What is claimed is:

1. A continuous microfilm camera comprising:
   (a) a transport path for feeding original sheets through a microfilming area;
   (b) two parallel opposite guide plates operatively mounted within the microfilming area and forming a transit slit therebetween, said slit being disposed in the transport path and having variable width, and at least one plate being transparent and at least one plate being movable with respect to the other plate; and magnetic attraction means attached to at least one of the plates for providing an attractive force decreasing in strength with increasing distance and directed toward the other guide plate.

2. A continuous microfilm camera as set forth in claim 1, wherein the magnetic attraction means comprises a strip of magnetic material mounted on one plate.

3. A continuous microfilm camera as set forth in claim 1, wherein the magnetic attraction means comprises at least two magnetic strips attracting each other and mounted on two confronting sides of the two plates.

4. A continuous microfilm camera as set forth in claim 3, wherein the magnetic strips are mounted at the edge of the respective guide plates which are located outside of the path of the transported sheets.

5. A continuous microfilm camera as set forth in claim 4, wherein the magnetic strips form a stop for providing a minimum width between the plates.

6. A continuous microfilm camera as set forth in claim 1, wherein the two entrance edges of the guide plates are bevelled towards the oncoming sheets.

7. A continuous microfilm camera as set forth in claim 1, comprising a stop attached to the apparatus for limiting the maximum width between the plates.

8. A continuous microfilm camera as set forth in claim 7, wherein the stop is mounted in a position depending on the size of the force of the magnetic attraction means so as to bring the plates back to minimum distance upon removal of other forces having widened the plate distance.

* * * * *